(12) United States Patent
Heinke et al.

(10) Patent No.: US 7,991,017 B2
(45) Date of Patent: Aug. 2, 2011

(54) DETERMINISTIC COMMUNICATION SYSTEM

(75) Inventors: Burkhard Heinke, Neu Wulmstorf (DE); Christian Wiese, Heeslingen (DE); Marcus Smidt, Neu Wulmstorf (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 12/452,439

(22) PCT Filed: Jul. 4, 2007

(86) PCT No.: PCT/EP2007/056734
§ 371 (c)(1),
(2), (4) Date: Feb. 18, 2010

(87) PCT Pub. No.: WO2009/003518
PCT Pub. Date: Jan. 8, 2009

(65) Prior Publication Data
US 2010/0158037 A1 Jun. 24, 2010

(51) Int. Cl.
*H04J 3/06* (2006.01)
(52) U.S. Cl. .................................. 370/510; 370/512
(58) Field of Classification Search .................. 370/389, 370/257, 282, 304, 324, 327, 350, 362, 400, 370/421, 451
See application file for complete search history.

(56) References Cited

U.S. PATENT DOCUMENTS 4,698,805 A * 10/1987 Sasuta et al. .................. 370/327
6,404,770 B1 * 6/2002 Fujimori et al. .............. 370/429

FOREIGN PATENT DOCUMENTS

DE 197 21 740 11/1998
DE 10 2006 004 191 8/2007

OTHER PUBLICATIONS

International Search Report for PCT/EP2007/056734, mailed Sep. 24, 2007.
Written Opinion of the International Searching Authority for PCT/EP2007/056734, mailed Sep. 24, 2007.
Frazier, H. et al., "Gigabit Ethernet: from 100 to 1,000 Mbps", IEEE Internet Computing, vol. 3, No. 1, (Jan. 1999), pp. 24-31.
Gauffin, L. et al., "Multi-gigabit networking based on DTM: A TDM medium access technique with dynamic bandwith-allocation", Computer Networks and ISDN Systems, vol. 24, No. 2, (Apr. 1, 1992), pp. 119-130.
ARINC: "AFDX/ ARINC 664 Tutorial (1500-049)", Internet Citation, [Online], (May 2005), 49 pages.

* cited by examiner

*Primary Examiner* — Brenda Pham
(74) *Attorney, Agent, or Firm* — Nixon & Vanderhye P.C.

(57) ABSTRACT

The invention relates to a communication system and a method for controlling a communication system for communicating audio data between each of a plurality of terminal units (T1-T3). In order to provide a deterministic communication protocol with lowest possible overhead and a system for implementing same said method is characterized by the steps of: examining an identity of said terminal units (T1-T3) by said central unit (10) during an initialization phase; transmitting a predetermined data frame including a first synchronization signal, a terminal unit address of a respective terminal unit, a payload field and a second synchronization signal by said central unit (10) via said master bus (14) during a configuration phase; and transmitting audio data through said data bus (12) by one of said plurality of terminal units (T1-T3) within an audio sample time interval that corresponds to the interval between said first synchronization signal and said second synchronization signal.

13 Claims, 5 Drawing Sheets

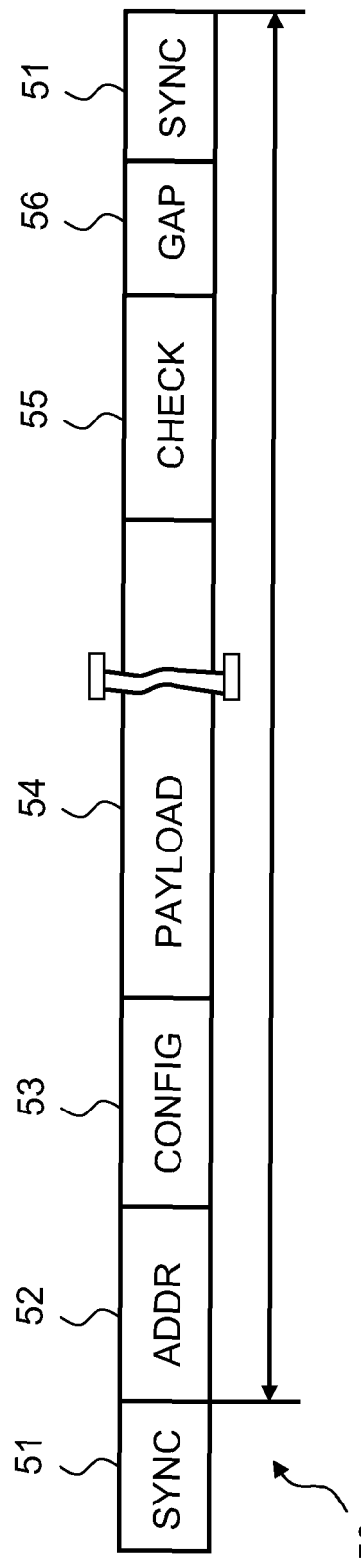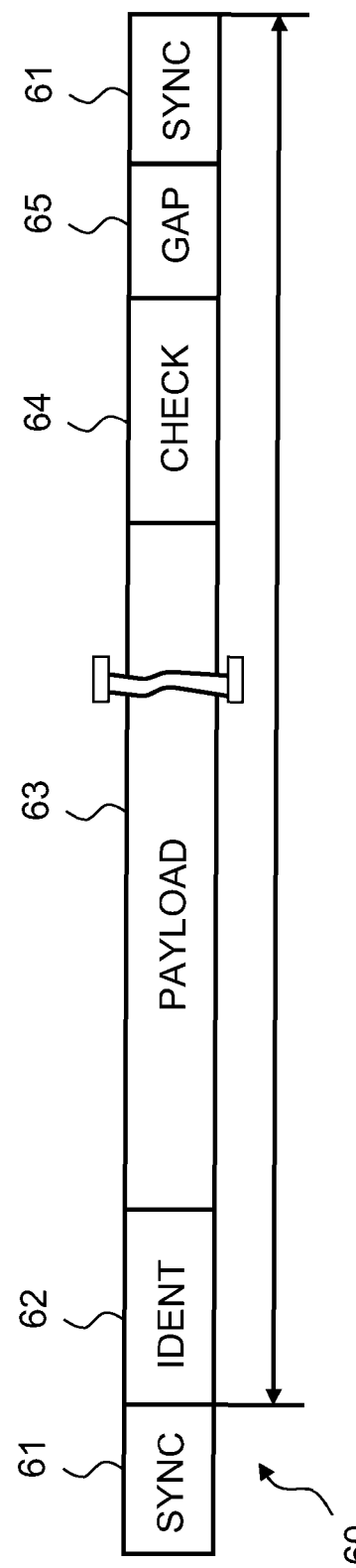

DETERMINISTIC COMMUNICATION SYSTEM

This application is the U.S. national phase of International Application No. PCT/EP2007/056734 filed 4 Jul. 2007, which designated the U.S., the entire contents of which is hereby incorporated by reference.

The invention relates to a deterministic communication system and in particular, yet not exclusively to avionic applications.

The system according to the invention may be applied to aircrafts of all kinds, in particular to airplanes. The invention may in general be applied to real-time applications, i.e. systems for time-critical communication and it may feature system functions of which the performance depends on a timely data exchange.

In the prior art Ethernet based point-to-point connections non-central, distributed bus access modules provide the physical layer. The bus access is e.g. ruled by the well-known CSMA/CD procedure (Carrier Sense multiple Access with Collision Detect). Such system however fails with real-time applications since it can be self-blocking and is not deterministic in time.

From DE 34 24 866 C2 and DE 34 26 893 A1 a system is known comprising one single common bus for all participants with configurable order and a number of time-slots for the connected stations or terminal units. In these systems first initializing and request phases are provided, in which the necessary configuration of stations is determined. In this way time windows for data communication may be dynamically allocated.

In Hammond, Joseph L., O'Reilly, Peter, "Performance Analysis of Local Computer Networks; Reading, Mass., USA, Addison-Wesley Publishing Company, Inc., 1986, pages 193-196; ISBN 0-201-11530-1, a polling network is described comprising a central computer through which polling of each location or station on the network in a predetermined order is effected to provide access to the channel. The polling network operates either in roll-call polling or hub polling. For roll-call polling the central computer initiates the polling sequence by sending a polling message to a chosen station. Upon completion of communication by that first chosen station the central computer continues with the next chosen station and so on. For hub polling the central computer sends out a polling message to an initial station, and upon completion of communication by the initial station the polling is automatically switched to the next station without the central computer being actively involved.

It is a disadvantage of the prior art however, that due to data transmission in the system wait time periods are unavoidable since each terminal unit must be individually addressed in order to prompt data transmission thereafter. The total wait time comprises a reaction time of the terminal units, acknowledgement of terminal address transmission and the delay time of the bus itself, depending on the physical length of the line.

It is the object of the present invention to provide a deterministic communication protocol with lowest possible overhead and a system for implementing same.

The object is achieved by the communication system for communicating audio data between each of a plurality of terminal units and the method for controlling same according to claims 1 and 9, respectively. Dependent claims are directed to preferred embodiments of the invention.

According to the invention a digital communication system is provided comprising a plurality of terminal units and a central unit. Said terminal units are coupled to a bus for data exchange. The communication process on the bus between the terminal units is controlled by said central unit. The above communication system is improved by providing an additional bus. Accordingly, the terminal units are connected to the central unit both through a master bus and a data bus. On the master bus the central unit exclusively transmits instructions to the terminal units. Hence, the central unit is the only transmitter on the master bus. However, also data may be transmitted on the master bus from the central unit to the terminal units. On the data bus each terminal unit may transmit data to the central unit. Hence, the central unit is the only receiver on the data bus. The access to the data bus by the terminal units is controlled by the central unit via the master bus. If data are to be transmitted from one terminal unit to another, receiving, terminal unit this has to be effected via the central unit. To that order an exchange buffer is provided in the central unit for mirroring and relaying received data.

In summary, the central unit is acting as a master or controller or control unit for controlling the data bus access by each of the system modules. On the data bus a time division multiplexed system is employed with dual loop communication. This time division multiplexed system is preferably based on a standard Ethernet physical layer for two separate buses. The system is dedicated for use in avionics viz. aircraft applications.

According to one aspect of the invention a method is provided for controlling a communication system for communicating audio data between each of a plurality of terminal units. Said communication system comprises:
a plurality of terminal units for buffering audio data;
a master bus for transmitting control signals to said terminal units;
a data bus for transmitting audio data from said terminal units;
a central unit requesting audio data from said plurality of terminal units via said master bus and receiving audio data through said data bus.

Said method is characterized by the steps of:
examining an identity of said terminal units by said central unit during an initialization phase;
transmitting a predetermined data frame including a first synchronization signal, a terminal unit address of a respective terminal unit, a payload field and a second synchronization signal by said central unit via said master bus during a configuration phase; and
transmitting audio data through said data bus by one of said plurality of terminal units within an audio sample time interval that corresponds to the interval between said first synchronization signal and said second synchronization signal.

In a preferred embodiment of the method according to the invention said terminal unit transmits a data frame through said data bus upon recognising its own address during said configuration phase. In this way the procedure of requesting data from the individual terminal units by the central unit is unified, no difference must be made between the initial request by the central unit and any of the subsequent requests for data delivery.

In an alternative preferred embodiment of the method according to the invention each of said plurality of terminal units transmits a data frame at a predetermined time through said data bus which time is determined by said central unit. This renders the terminal units independent of any request for data and delivery issued by the central unit so as to result in a stand-alone sub-system.

Preferably the order of transmissions by said plurality of terminal units during said payload phase is determined in advance by said central unit. E.g. the order of terminal units to deliver their data may be stored in a look-up table, and hence it may be monitored and even be edited by a user off-line, i.e. remote from the actual operating environment and in advance.

In general said synchronization signal may be generated by a separate master clock generator. The master clock generator may or may not be integrated in the system, and due to stability requirements it may be located in a special environment.

Preferably said synchronization signal is a standard signal, in particular a signal that complies with the IEEE 802.3-standard.

More preferably said terminal units recover their respective clock signals from said synchronization signal. Clock recovery is achieved by using a phase locked loop.

In particular said data exchange between terminal units is performed by mirroring said data in an exchange buffer in the central unit. This renders a complex adaptation of the communication protocol to either sending data to the control unit or to another terminal unit obsolete.

According to another aspect of the invention a communication system is provided for communicating audio data between each of a plurality of terminal units. Said communication system comprises:
a plurality of terminal units for buffering audio data;
a master bus for transmitting control signals to said terminal units;
a data bus for transmitting audio data from said terminal units; and
a central unit requesting audio data from said plurality of terminal units via said master bus and receiving audio data through said data bus.

The communication system is characterized in that
said central unit examines an identity of said terminal units during an initialization phase;
said central unit transmits a predetermined data frame including a first synchronization signal, a terminal unit address of a respective terminal unit, a payload field and a second synchronization signal via said master bus during a configuration phase; and
audio data are transmitted through said data bus by one of said plurality of terminal units within an audio sample time interval that corresponds to the interval between said first synchronization signal and said second synchronization signal.

In a preferred embodiment of the communication system according to the invention said central unit comprises a terminal configuration unit containing a list of said plurality of terminal units. In other words the identity of all of the terminal units is listed in the system, and every terminal unit that is new in the system has to be registered by the terminal configuration unit so as to get its access authorization. The term "identity" is to be construed here as comprising—possibly among other items—the particular number (address) of the respective terminal unit as well as its authorization to access the common bus(es).

In particular said terminal configuration unit is preferably connected to a transfer unit for generating said data frame. By separating the data frame generation from supervisory tasks such as identity checks, performed by the terminal configuration unit, the system is made more flexible, and due to its modular design failures may be identified more easily which in turn enhances the system reliability.

In particular each of said plurality of terminal units of the communication system comprises a phase locked loop for clock recovery from said synchronization signal. Thus each terminal unit may synchronize its clock whenever necessary without any delay that might otherwise be induced if a common synchronization pulse is issued by the central unit.

Additionally, as part of said central unit an exchange buffer is preferably provided for data exchange between terminal units that enables mirroring of received data and forwarding them to a transceiver unit of said central unit.

The invention features—inter alia—the following advantages over the prior art. Since the communication system according to the invention allows a deterministic bus access that is controlled by a central control unit a high reliability of the communication is achieved. In order to improve system reliability even further the system is preferably designed in redundancy. In this case a first central unit out of two is active and the other is in a "hot-stand-by" status. If the currently active unit fails the other unit takes over. Hence, the system is particularly useful for avionics viz. aircraft applications with fast control (switching) data and digitized analogue signals, in particular for the fast transmission of audio signals. Moreover, the system according to the invention allows a more efficient organization of the data bus since two separate bus lines are employed, which are connected to the plurality of terminal units. A central unit uses the master bus only as a control bus for transmission of data from the central unit to the terminal units. The connected terminal units can send their data on a shared bus viz. data bus. Further, the invention provides a simple modular structure of the communication system and the whole data transfer is no longer at risk to be blocked in case of a failure of an individual terminal unit.

In the following the invention will be explained in more detail with reference being made to embodiments depicted in the accompanying drawing, by way of example only.

FIG. 4A shows an embodiment of a data frame for the transmission of data from the central unit to the terminal units in the configuration phase according to the invention.

FIG. 4B shows an embodiment of a data frame for the transmission of data from the terminal units to the central unit in the configuration phase according to the invention.

Figure 1:
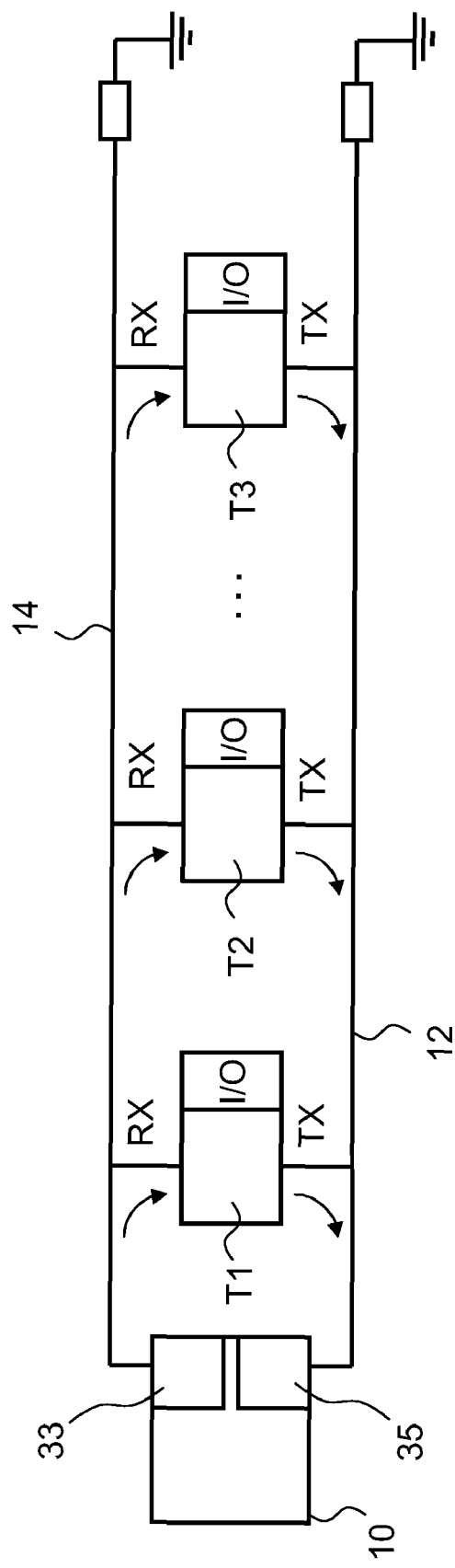
FIG. 1 shows a schematic view of a first embodiment of the communication system according to the invention.

FIG. 1 shows a block diagram of an embodiment of the communication system according to the invention. A central unit 10 is connected on the one hand via a data-bus (shared bus) 12 to transmitter units TX of several terminal units T, each being designated T1, T2, and T3, respectively. On the other hand the central unit 10 is connected via a master bus 14 to receiver units RX of said terminal units T. The central unit 10 is the only transmitter on the master bus 14, i.e. the terminal units T only receive data from the central unit 10 as passive elements. The data bus 12 is used for multiplexed data transmission from the terminal units T1, T2, T3 to the central unit 10. The order in which the terminal units T access the bus 12 is controlled by the central unit 10.

Figure 2:
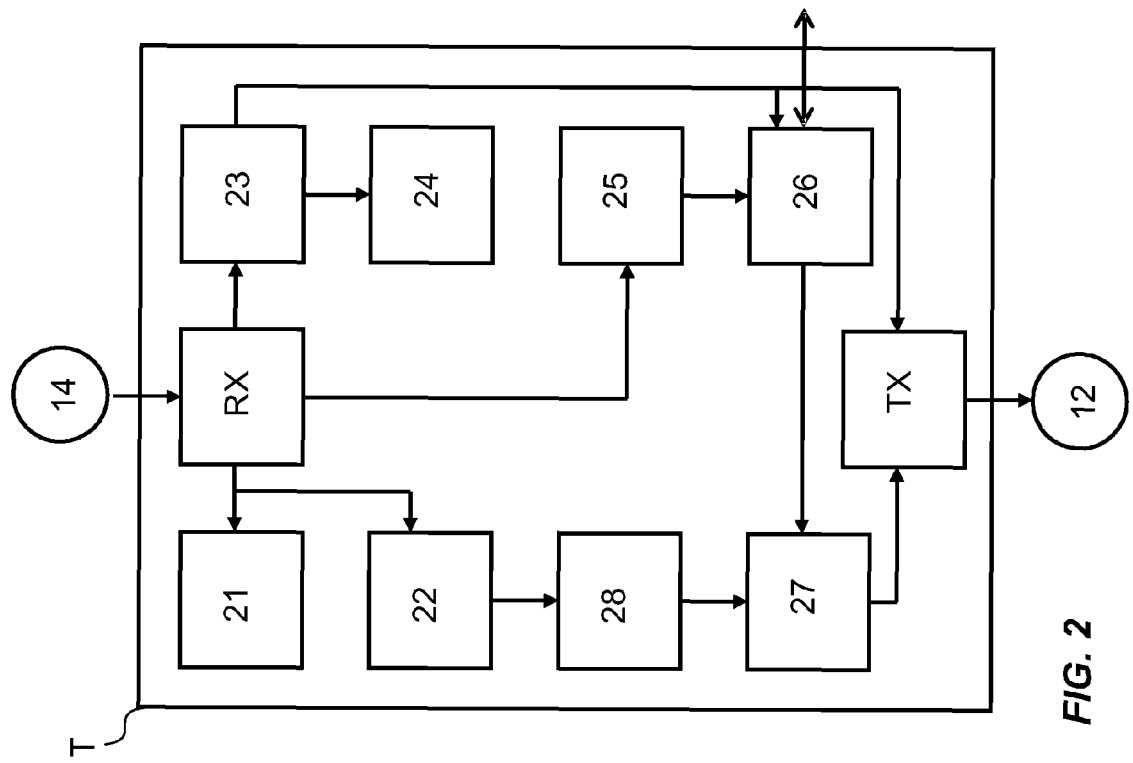
FIG. 2 shows a functional diagram of an embodiment of the terminal units according to the invention in the communication system of FIG. 1.

FIG. 2 shows a block diagram of a terminal unit T in FIG. 1. Each terminal unit T comprises a receiver RX and a transmitter TX. Further it is provided with an address recognition unit 21, a receive state controller 22, a frame-PLL 23 with a master clock, a loop counter 24, a data input buffer 25, an I/O device interface 26, a data output buffer 27, and a transmission controller 28.

The receiver RX is adapted to distinguish data signals, time signals and address signals. In the address recognition module 21 the address is filtered: a reaction of the respective terminal unit T is only prompted upon receipt of the proper address; otherwise the received data are disregarded.

From the received time signals a master clock is recovered in the frame-PLL 23 which master clock is supplied from the central unit 10. The time signal from the master clock 23 is shared by all components of the terminal unit T. The regenerated clock is fed in the loop counter 24, which determines the time for the next bus access of the respective terminal unit T. The details of the bus access are stored in the receive state controller 22. Also the data input buffer 25 is supplied with the master clock from generator 23 and the divided clock rate from the loop counter 24.

Data frames that are received by the receiver unit RX of terminal unit T from the master bus 14 are processed depending on the contents conveyed with the data. The receiver state controller 22 supervises the flow of data being received via the receiver RX. It is connected to the transmission controller 28 and to the input/output interface 26 and to the loop counter 24. Data that are received in each data frame by the receiver RX are buffered for each bus frame in the input data buffer 25 if they are relevant for the communication with other systems and system modules. The data input buffer 25 is controlled by the I/O interface 26. The input/output interface 26 may comprise a DA-converter, speakers and other control units.

If data are to be transferred from one terminal unit T to another unit T or to the central unit 10 such data are buffered in the data output buffer 27 from which they are shifted to the transmitter means TX then. The data are buffered for each bus frame in the output data buffer 27 in the order in which they are transmitted in data frames. The delivery of such data to the transmitter TX is processed in appropriate processing steps by the transmission controller 28 in the terminal unit T itself.

In general terminal units T are dedicated to specific functions. However there may be employed multiple terminal units T with equivalent functions.

If the buses 12, 14 are Ethernet connections the receiver unit RX may be designed in accordance with the standard IEEE 802.3.

Figure 3:
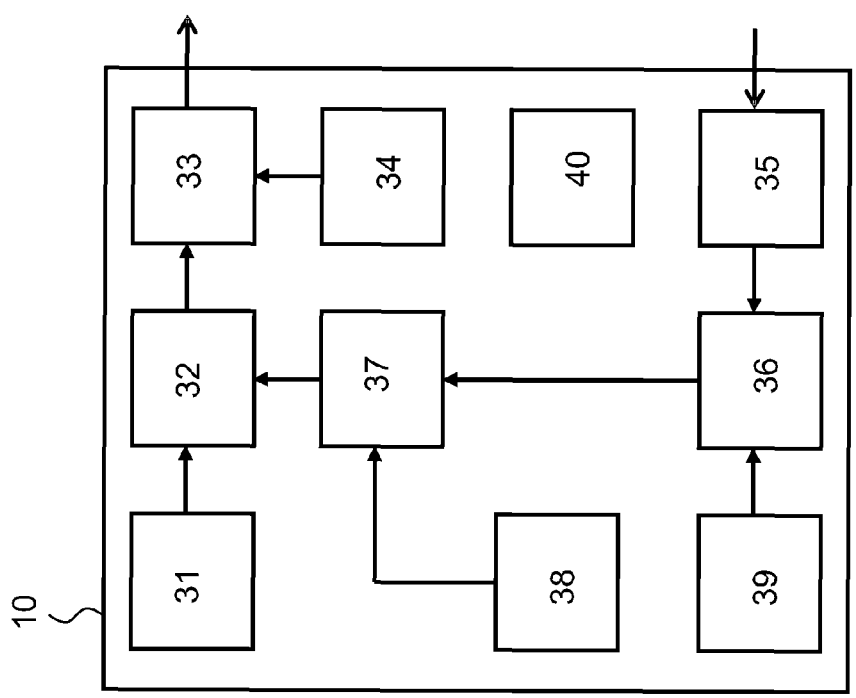
FIG. 3 shows a functional diagram of an embodiment of the central unit according to the invention in the communication system of FIG. 1.

FIG. 3 shows a block diagram of the central unit 10 in FIG. 1. The central unit 10 comprises a terminal unit configuration controller 31, a transmitter data memory 32, a transmitter 33, a system clock generator 34, a receiver 35, a receiver data memory 36, an exchange buffer 37, a data switch control matrix 38, a receiver data configuration module 39, and a main bus phase controller 40. The terminal unit configuration control block 31 comprises a list of the terminal units T that are connected to the central unit 10. This list can be easily adapted by entering new data e.g. from a connected host controller, or it may be adapted to comply with modified operation conditions. The configuration control block 31 is connected to a transmitter data memory 32, and memory 32 in turn is connected to a transmitter unit 33. In addition, the configuration control block 31 determines which data from the transmitter data memory 32 is currently to be shifted into the transmitter unit 33.

The transmitter unit 33 generates a complete data frame on the master bus 14 including a synchronizing signal that is valid for all terminal units T. The synchronizing signal itself may be controlled or may be determined by the system clock generator 34 which is connected to the transmitter unit 33.

A receiver module 35 reads and monitors the data that are received from the terminal units T. The data are sent to a receiver data memory 36 acting as a buffer memory. A receiver configuration unit 39 is assigned to the receiver data memory 36. In case a communication link between several terminal units T is established, data can be directly transferred into the transmitter data memory 32 via an exchange buffer 37. The exchange buffer 37 is controlled and monitored by a data switch control array 38.

The following three communication phases on buses 12 and 14 may be distinguished:
1. Initialization Phase;
2. Configuration Phase;
3. Payload data Phase.

These phases are controlled by the master bus control unit 40.

By this arrangement the data capacity of the terminal units T that are respectively connected to the bus may be adapted and optimised. During the initialization phase the central unit 10 monitors which one of the terminal units T has access to the bus 12 currently or at a predetermined time. It further supervises which data are demanded on the bus 12. In particular, if there are multiple requests of the connected terminal units T at a time, these may be collected and prioritized by the central unit 10.

FIG. 4A shows a data frame for the transmission of data from the central unit 10 to the terminal units T on master bus 14 whereas FIG. 4B shows a data frame for the transmission of data from the terminal units T to the central unit 10 on data bus 12 in the configuration phase. In the following figures the length of a period is indicated by a double arrow.

Each data frame 50 on the bus 14 is started with a synchronization (Sync) signal 51. Preferably this signal is derived from or corresponds to the protocol concerning higher level synchronization in accordance with the IEEE 802.3 standard.

The Sync signal 51 and synchronization sequence, respectively, consist of a 7 Bytes long "preamble" and a 1 Byte long "start frame sequence". The trailing end bits of the long "start frame sequence" ("11" according to IEEE 802.3) will be used for exact overall synchronizing. This determines the frame-time of the user audio sample rate of the system as it become clear in the following description with reference to FIG. 4A. In order to achieve a simple way of audio data transmission the distance between two Sync signals corresponds to the system audio sample time. This means the sample frequency of A/D or D/A converters being connected e.g. to the terminal units is valid for the entire system. In other words, all terminal units T in the system are commanded by the same clock.

During the configuration phase the central unit 10 transmits a fixed data frame starting with the Sync-sequence 51 as described above. This Sync-signal 51 is used as a master synchronization for the whole system. An additional PLL is used in order to resynchronize the audio sampling process and to provide exact timing information for all terminal units without the help of an extra clock line or similar means. (It should be noted that by contrast the standard IEEE 802.3 provides a single bit timing only.) In this way the Sync-signal 51 may be readily altered, i.e. the frequency or time frame for the whole system may be dynamically changed in a jitter-like approach. In this way the EMI behaviour of the complete bus system 1 is improved.

The sync-signal 51 is followed by the address 52 of that particular terminal unit T, for which the respective frame is intended. Special addresses are reserved in the system 1 which are not assigned to real physical terminal units T. These address words are used as broadcast addresses and the following configuration data 53 determine the behaviour of all terminal units T that are connected thereto.

In this way a certain volume of payload data can be reserved as e.g. audio-data which are sent then continuously as multi-channel broadcast from the central unit 10 to the terminal units T. In the case the intended address belongs to an individual terminal unit that is present in the system the settings of that terminal unit T will be changed by the configuration data 53. The following payload data 54 can contain e.g. switching data for a respective unit.

Each data frame 50 will be terminated by a check sequence 55 for data validation. The check sequence may be e.g. a simple CRC check-sequence. The described data frame 50 is repeated then by starting again with a Sync-sequence 51. The corresponding audio sample time is determined then by the distance from one end of the Sync-sequence 51 to the end of the subsequent Sync-sequence 51. The system according to the present invention has the advantage that there are no time gaps on the Master bus 14 for discharging processes when there is traffic on the same physical line from different transmitters T. Between field 55 and field 51 there may be provided a gap 56 so as to adapt the total frame length of frame 50 to the actual system requirements.

After the audio sample time has been determined by the frame in FIG. 4A, the data frame from one of the terminal units T to the central unit 10 will be explained in the following with reference to FIG. 4B. During the configuration phase the terminal unit T will react on receipt of its own address by sending a single data frame 60 on the shared bus. This answer is released by the address recognition circuit. The data frame 60 also starts with a Sync-sequence 61, preferably in accordance with IEEE 802.3, however it is not used for system synchronization. The arrangement of the sync sequence 61 according to the IEEE 802.3 standard benefits from the fact that standard Ethernet modules and transceivers may be employed. The Sync-sequence 61 is followed by an identifier field 62 from the terminal unit T. The identifier field 62 contains the individual address of the terminal unit T and the requested volume of payload data. The payload data field 63 of the terminal unit data frame in turn is followed by a check sequence 64 for data validation. Similar to frame 50 from central unit 10 to terminal units T the frame 60 from terminal units T to central unit 10 is ended by a second sync-field 61 with a gap 65 between sync field 61 and check sequence 64, if necessary. The frame time depends on the actual system configuration.

Upon end of transmission by one of the terminal units T the central unit 10 may address the same or another terminal unit T. During this process there is no communication on the data bus until the subsequent address is relayed and recognized, respectively.

During the configuration phase the central unit 10 determines the order in which the terminal units T are addressed. This order is not necessarily a consecutive order. Consequently each terminal unit T must store an individual counter value that is retrieved from the configuration data field 53 by the terminal unit T.

Thereafter the central unit 10 can start the payload data phase with a predetermined terminal unit address (which however is no longer transmitted via the bus) and a special configuration data field. This means that upon the next Sync-sequence the internal loop counters 24 of all the terminal units T are started. Due to the individual counter value that is stored in each terminal unit T each unit T will send its own data frame on the shared bus 12 at a predetermined time. The order of access to the bus is set by the central unit 10 by means of the various counter values that are stored in each of the terminal units T.

Figure 5A:
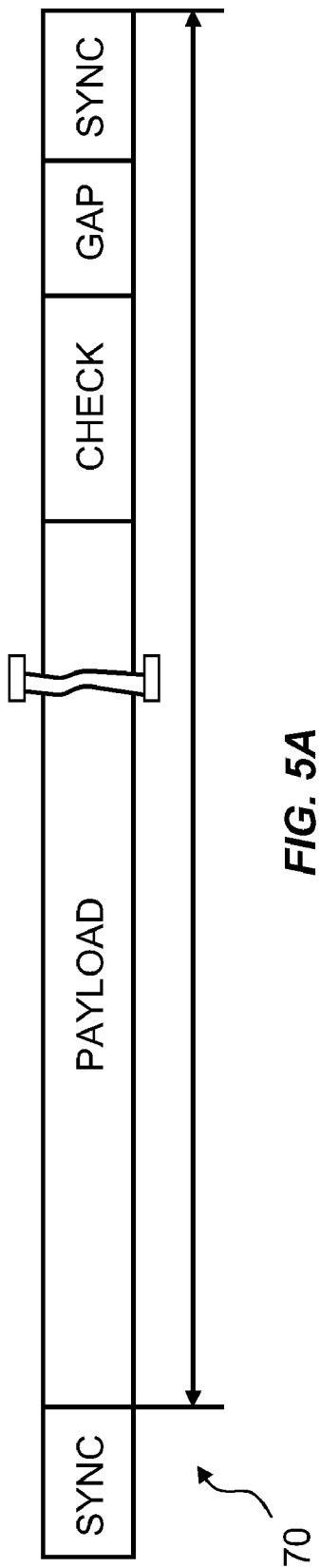
FIG. 5A shows an embodiment of a data frame for the transmission of data from the central unit to the terminal units in the payload phase according to the invention.
Figure 5B:
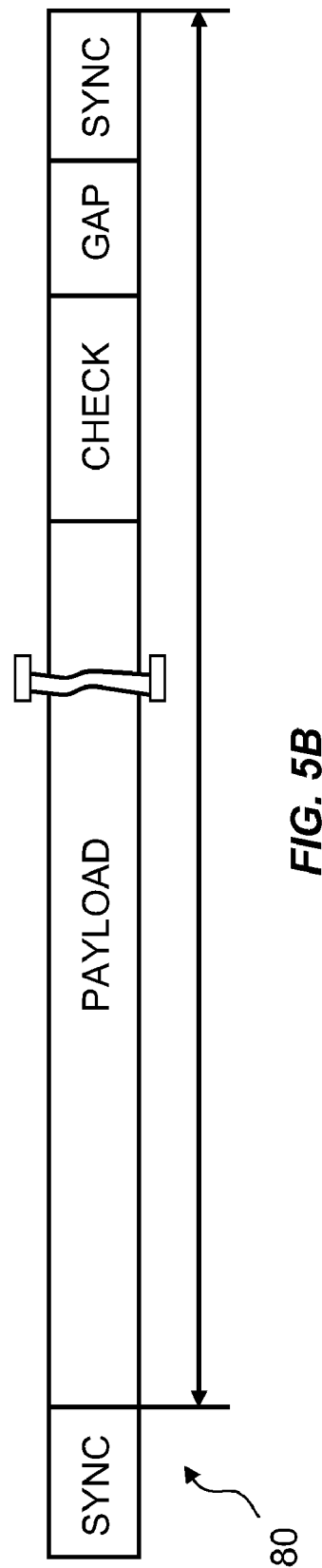
FIG. 5B shows an embodiment of a data frame for the transmission of data from the terminal units to the central unit in the payload phase according to the invention.

The above configuration phase is followed by the payload phase. The payload phase frames on buses 12 and 14, respectively, differ from the corresponding frames in the configuration phase in that they are no longer charged with any address overhead. The respective frames on buses 12 and 14 are shown in FIG. 5A and FIG. 5B. Frame 70 from the central unit 10 to any of the terminal units T in FIG. 5A comprises only sync-sequences and payload sequences. It is terminated by a check sequence and sync bits with an interposed gap, if necessary. The period between two subsequent sync bit trains determines the audio sample time. Accordingly, data frame 80 from the terminal unit T to the central unit 10 in FIG. 5B also comprises only sync-sequences and payload sequences, being terminated by a check sequence and sync bits with an interposed gap, if necessary. The period between two subsequent sync bit trains determines the frame time depending on system configurations.

Hence, due to different arrangements in configuration phase and in payload phase data frames 70, 80 differ from the corresponding frames 50 and 60, respectively, on the master bus 14 and the shared bus 12. With the order of bus access being fixed only the number of Sync-signals from the central unit determines the bus access on the shared bus. This means that there is no more protocol overhead within the data frames and almost the complete bus access time is used for payload data.

For realization of the invention components according to IEEE 802.3 (physical layer IEEE 802.3) may be used.

For security relevant applications multiple master buses 14 may be provided instead of only one.

For fast audio data transmission the master clock recovery may be realized by an audio-PLL that is synchronized to the trailing end bits of the sync-signal. The bit timing information of the Sync-signal can be derived from the integrated standard PLLs according to IEEE 802.3 (physical layer IEEE 802.3).

Data exchange between terminal units T that are connected to the system 1 may be accomplished by scaling the data volume.

Data exchange between terminal units T may be readily accomplished by mirroring the respective data in an exchange buffer 37 according to a deterministically triggered protocol.

In summary, the communication system viz. avionics system according to the invention has a modular architecture in which the data transfer is no longer blocked by an individual terminal unit in case of a failure. Due to the separated bus structure standard Ethernet components may be used for the physical layer, e.g. according to 10BASE-T: IEEE 802.3 Physical Layer specification for a 10 Mb/s CSMA/CD local area network, IEEE 802.3 Clause 14.; 100BASE-T: IEEE 802.3 Physical Layer specification for a 100 Mb/s CSMA/CD local area network, IEEE 802.3 Clause 22 and 28 without auto-collision detect, as it would be necessary for single bus systems.

Moreover, the dual bus structure allows a continuous data broadcast from the central unit to the individual terminal units, and simple means are provided for a synchronous communication system which may be readily adapted to audio-data transmissions.

Figure 6:
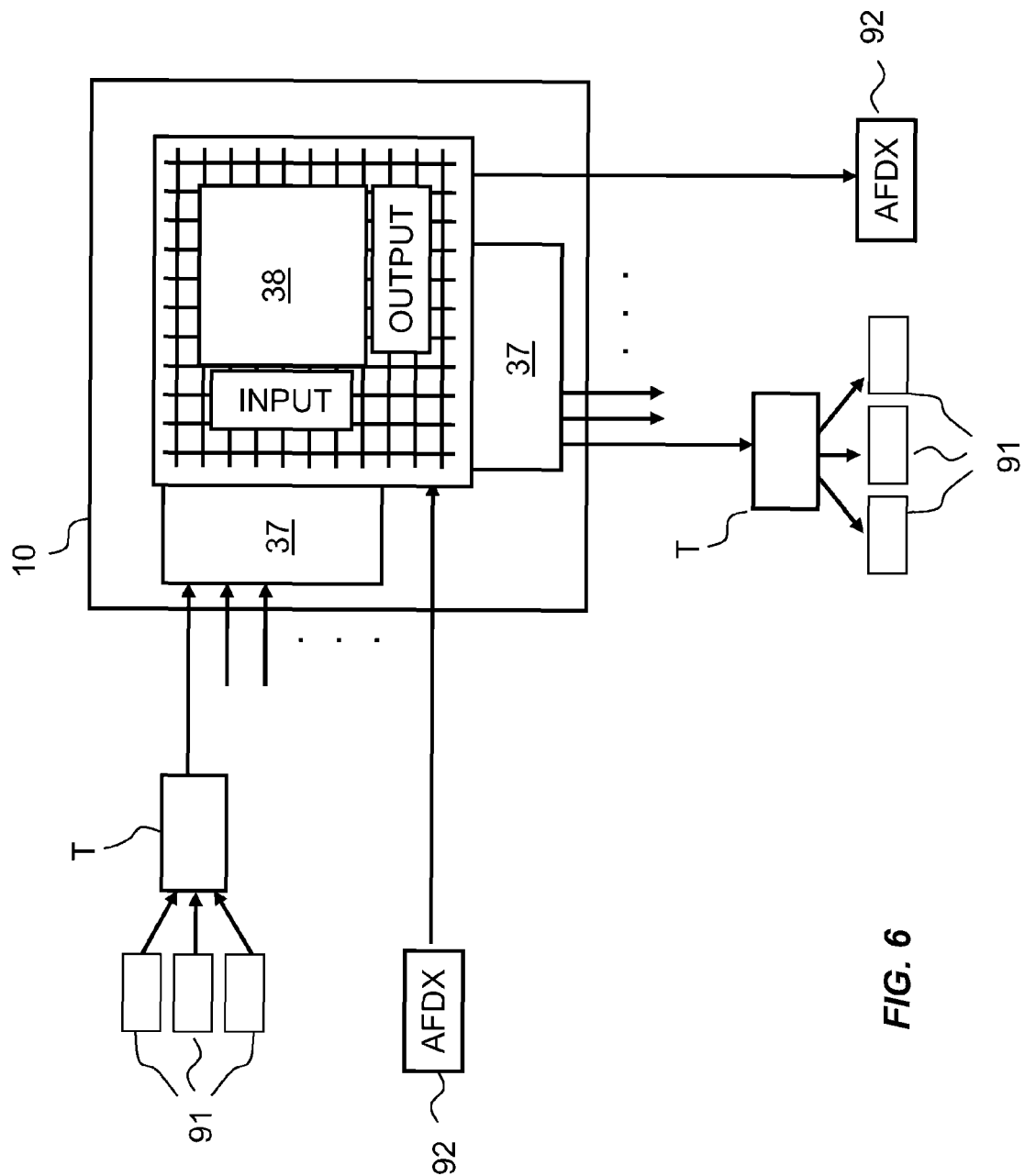
FIG. 6 shows an embodiment of the invention related to data exchange between terminal units.

In addition data-exchange between individual terminal units is possible. This will be explained in the following with reference to FIG. 6 showing a multiplexed dual loop communication system. Its central component is the above mentioned data switch control matrix 38 comprising a scalable exchange buffer 37 on its input side and a scalable exchange buffer 37 on its output side. Said data switch control matrix 38 is provided for direct communication between terminal units T. The data bandwidth is scalable and depends on the number of data frames assigned to a pair of terminal units T. The amount of available data frames is fixed and applies to all pairs of terminal units T that are supposed to participate in communication. The amount of the payload data to be exchanged between terminal units T is set by a host CPU (not shown) of the central unit 10. Due to the determined update-rate of the bus-system a data-channel with a guaranteed transmission rate is opened. The actual output data at the terminal unit can then be fed to other data links with lower update-rate like "CAN", "RS485", "RS232" etc. which are exemplified in FIG. 6 as terminal unit interface 91. The data switch control matrix 38 is preferably hardwired, i.e. without any software components being involved. Thus fast data transfer is feasible; the data-exchange with the fixed frame-structure allows a full hardware-based design of the data switch control matrix 38 with input and output buffers. The transfer time of data between two terminal units T can be reduced to last as long as some frames.

Optionally, it is possible to use the central unit 10 as an access point of the existing network of terminal units T. In this case the interface of the central unit 10 may be governed by a specific protocol for aircraft applications like AFDX (Avionics Full DupleX Switched Ethernet), also known as ARINC standard No. 664 and related to a computer network and protocol for communications between aircraft units. It is based on Ethernet with additional "quality of service" (QoS) and deterministic path definition. This interface is exemplified in FIG. 6 as central unit interface 92.

| Reference numerals | |
|---|---|
| 10 | central unit |
| 12 | data-bus (shared bus) |
| 14 | master bus |
| 21 | address recognition module |
| 22 | receiver state control unit |
| 23 | master clock |
| 24 | loop counter |
| 25 | data input buffer |
| 26 | I/O interface |
| 27 | output data buffers |
| 28 | transmit control |
| 31 | terminal unit configuration control block |
| 32 | transmitter data memory |
| 33 | transmitter unit |
| 34 | system clock generator |
| 35 | receiver module |
| 36 | receiver data memory |
| 37 | exchange buffer |
| 38 | data switch control array |
| 39 | receiver configuration unit |
| 40 | master bus control unit |
| 50 | data frame in configuration phase |
| 51 | synchronization (Sync) signal |
| 52 | address |
| 53 | configuration data |
| 54 | payload data |
| 55 | check sequence |
| 56 | gap |
| 60 | data frame in configuration phase |
| 61 | sync field |
| 62 | identifier field |
| 63 | payload data field |
| 64 | check sequence |
| 65 | gap |
| 70 | data frames in payload phase |
| 80 | data frames in payload phase |
| 91 | terminal unit interface |
| 92 | central unit interface |

| Reference numerals | |
|---|---|
| RX | receiver unit |
| T, T1, T2, and T3 | terminal units |

The invention claimed is:

1. A method for controlling a communication system for communicating audio data between each of a plurality of terminal units of said communication system, wherein the method comprises the steps of:
buffering audio data by a plurality of terminal units;
transmitting control signals to said terminal units through a master bus;
transmitting audio data from said terminal units through a data bus;
requesting by a central unit said audio data from said plurality of terminal units via said master bus and receiving audio data through said data bus;
examining an identity of said terminal units by said central unit during an initialization phase;
transmitting a predetermined data frame including a first synchronization signal, a terminal unit address of a respective terminal unit, a payload field and a second synchronization signal by said central unit via said master bus during a configuration phase; and
transmitting audio data through said data bus by one of said plurality of terminal units within an audio sample time interval that corresponds to the interval between said first synchronization signal and said second synchronization signal.

2. The method according to claim 1, wherein said terminal unit transmits a data frame through said data bus upon recognising its own address during said configuration phase.

3. The method according to claim 1, wherein said plurality of terminal units transmits a data frame at a predetermined time through said data bus which time is determined by said central unit.

4. The method according to claim 1, wherein the order of transmissions by said plurality of terminal units during said payload phase is determined in advance by said central unit.

5. The method according to claim 1, wherein said synchronization signal is generated by a master clock generator.

6. The method according to claim 1, wherein said synchronization signal is a standard IEEE 802.3-signal.

7. The method according to claim 1, wherein said terminal units perform a clock recovery from said synchronization signal using a phase locked loop (PLL).

8. The method according to claim 1, wherein said a data exchange between terminal units is performed by mirroring said data in an exchange buffer in the central unit.

9. A communication system for communicating audio data between each of a plurality of terminal units, wherein said communication system comprises:
a plurality of terminal units for buffering audio data;
a master bus for transmitting control signals to said terminal units;
a data bus for transmitting audio data from said terminal units; and
a central unit requesting audio data from said plurality of terminal units via said master bus and receiving audio data through said data bus,
wherein:
said central unit examines an identity of said terminal units during an initialization phase;

said central unit transmits a predetermined data frame including a first synchronization signal, a terminal unit address of a respective terminal unit, a payload field and a second synchronization signal via said master bus during a configuration phase; and audio data are transmitted through said data bus by one of said plurality of terminal units within an audio sample time interval that corresponds to the interval between said first synchronization signal and said second synchronization signal.

10. The communication system according to claim 9, wherein said central unit comprises a terminal configuration unit containing a list of said plurality of terminal units.

11. The communication system according to claim 10, wherein said terminal configuration unit is connected to a transfer unit for generating said data frame.

12. The communication system according to claim 9, wherein each of said plurality of terminal units comprises a phase locked loop for clock recovery from said synchronization signal.

13. The communication system according to claim 9, wherein said central unit an exchange buffer is provided for data exchange between terminal units that enables mirroring of received data and forwarding them to a transceiver unit of said central unit.

* * * * *